(12) United States Patent
Choi et al.

(10) Patent No.: US 11,414,504 B2
(45) Date of Patent: Aug. 16, 2022

(54) METHOD FOR PREPARING TRANSITION METAL COMPLEX

(71) Applicant: LG Chem, Ltd., Seoul (KR)

(72) Inventors: Gyeong Shin Choi, Daejeon (KR); Dong Hyun Jo, Daejeon (KR); Hyun Taek Oh, Daejeon (KR); Won Hee Kim, Daejeon (KR); Seung Young Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/753,556

(22) PCT Filed: Mar. 21, 2019

(86) PCT No.: PCT/KR2019/003319
§ 371 (c)(1),
(2) Date: Apr. 3, 2020

(87) PCT Pub. No.: WO2019/182383
PCT Pub. Date: Sep. 26, 2019

(65) Prior Publication Data
US 2020/0291148 A1   Sep. 17, 2020

(30) Foreign Application Priority Data

Mar. 21, 2018 (KR) ........................ 10-2018-0032599

(51) Int. Cl.
C08F 136/08 (2006.01)
C07F 19/00 (2006.01)

(52) U.S. Cl.
CPC .......... C08F 136/08 (2013.01); C07F 19/005 (2013.01)

(58) Field of Classification Search
None
See application file for complete search history.

(56) References Cited

U.S. PATENT DOCUMENTS

| | | | |
|---|---|---|---|
| 6,008,307 A | 12/1999 | Shaffer | |
| 6,100,414 A | 8/2000 | Li et al. | |
| 6,844,402 B1 | 1/2005 | Liu et al. | |
| 2002/0049135 A1 | 4/2002 | Moody et al. | |
| 2003/0176606 A1 | 9/2003 | Bohnenpoll et al. | |
| 2005/0090383 A1 | 4/2005 | Thiele et al. | |
| 2007/0010637 A1 | 1/2007 | Lee et al. | |
| 2007/0179046 A1 | 8/2007 | Lee et al. | |
| 2008/0125556 A1 | 5/2008 | Ohkita et al. | |
| 2008/0221285 A1 | 9/2008 | Walter et al. | |
| 2009/0105432 A1 | 4/2009 | Rath et al. | |

FOREIGN PATENT DOCUMENTS

| | | |
|---|---|---|
| CN | 1302303 A | 7/2001 |
| CN | 1568332 A | 1/2005 |
| CN | 1890275 A | 1/2007 |
| CN | 101223195 A | 7/2008 |
| CN | 101282785 A | 10/2008 |
| CN | 101379093 A | 3/2009 |
| JP | 310504048 A | 4/1998 |
| JP | 2003277428 A | 10/2003 |
| JP | 2004516339 A | 6/2004 |
| KR | 20080034024 A | 4/2008 |
| KR | 20080044870 A | 5/2008 |

OTHER PUBLICATIONS

Kuhn, F. et al. Angew. Chem. Int. Ed. 2003, 42, No. 11, 1307-1310.*
Syukri, S. et al., "Modified MCM-41-supported acetonitrile ligated copper(II) and its catalytic activity in cyclopropanation of olefins", Microporous and Mesoporous Materials, Nov. 22, 2007, pp. 171-177, vol. 113, Elsevier Inc.
European Search Report for Application No. EP19772316.6, dated Dec. 22, 2020, 10 pages.
Joseph H. Rivers et al., "Synthesis and structures of the homoleptic cations [M(PMe3)5]+(M=Rh, Ir)", Chemical Communications, vol. 46, No. 24, Jan. 1, 2010, pp. 4300-4302, XP055756093.
Ma L et al., "Self-assembly of cationic palladium complexes by redistribution of pyridine ligands", Inorganica Chimica Acta, Elsevier BV, NL, vol. 358, No. 12, Aug. 1, 2005, pp. 3478-3482, XP027630583.
Silvana F. Rach et al., "A straightforward synthesis of cationic nitrile ligated transition metal complexes with the [B (C6F5)4] anion", Journal of Organometallic Chemistry, Elsevier, Amsterdam, NL, vol. 696, No. 9, Feb. 8, 2011, pp. 1817-1823, XP028407254.
Xuliang Dai et al., "[Me 2 NN]Co([eta] 6-toluene): O=O, N=N, and O=N Bond Cleavage Provides [beta]-Diketiminato Cobalt [mu]-Oxo and Imido Complexes", Journal of the American Chemical Society, vol. 126, No. 15, Mar. 25, 2004, pp. 4798-4799, XP055756701.
Buschmann et al., "Sources of Naked Divalent First-Row Metal Ions: Synthesis and Characterization of [MII (NCMe)6]2+ (M=V, Cr, Mn, Fe, Co, Ni) Salts of Tetrakis[3,5-bis(trifluoromethyl)phenyl]borate", Chemistry European Journal, Sep. 1998, vol. 4, No. 9, pp. 1731-I 737.
International Search Report from Application No. PCT/KR2019/003319 dated Jun. 26, 2019, 3 pages.
Jacob et al., "Cationic polymerizations at elevated temperatures by novel initiating systems having weakly coordinating counteranions", Polymer Bulletin, Oct. 1998, vol. 41, pp. 503-510.
Kostjuk et al., "Cationic Polymerization of Isobutylene at Room Temperature", Journal of Polymer Science, Part A: Polymer Chemistry, Feb. 2013, vol. 51, Issue 3, pp. 471-486.
Lambert et al., "Crystal Structure of a Silyl Cation with No Coordination to Anion and Distant Coordination to Solvent", Science, Jun. 1993, vol. 260, Issue 5116, pp. 1917-1919.

(Continued)

*Primary Examiner* — Clinton A Brooks
(74) *Attorney, Agent, or Firm* — Lerner, David, Littenberg, Krumholz & Mentlik, LLP

(57) ABSTRACT

The present invention provides a method for preparing a transition metal complex, including a step of preparing a dispersion including a transition metal salt or alkoxide, and a coordinating solvent; and a step of reacting an organic borate-based compound containing a carbon-based, silyl-based or amine-based cation and a borate-based bulky anion, with the dispersion, wherein the transition metal is one or more selected from the metals in group 7 to group 12.

13 Claims, No Drawings

(56) References Cited

OTHER PUBLICATIONS

Li et al., "Inorganic/organometallic catalysts and initiators involving weakly coordinating anions for isobutene polymerisation", Coordination Chemistry Reviews, Jul. 2011, vol. 255, Issues 13-14, pp. 1541-1557.

Li et al., "Solvent-Ligated Copper(II) Complexes for the Homopolymerization of 2-Methylpropene", Chemistry European Journal, Sep. 2008, vol. 14, Issue 26, pp. 7997-8003.

Shaffer et al., "Noncoordinating Anions in Carbocationic Polymerization", Journal of Polymer Science Part A: Polymer Chemistry, Jan. 1997, vol. 35, Issue 2, pp. 329-344.

Supporting Information for Inorganic Chemistry, 1994, vol. 33, No. 24, pp. 5374-5375, DOI: 10.1021/ic00102a004.

Vierle et al., "Highly Reactive Polyisobutenes Prepared with Manganese(II) Complexes as Initiators", Angewandte Chemie International Edition, Mar. 2003, vol. 42, No. 11, pp. 1307-1310.

Vierle et al., "Solvent-Ligated Manganese(II) Complexes for the Homopolymerization of Isobutene and the Copolymerization of Isobutene and Isoprene", Chemistry European Journal, Dec. 2004, vol. 10, Issue 24, pp. 6323-6332.

Zhang, Guofang, Synthesis and Characterization of Metal-Metal Multiply Bonded Complexes and Catalytic Applications of Solvent Stabilized Transition Metal Complexes for Polymerization of Olefins, Dissertalion, Shaanxi Normal Univ, Jun. 18, 2001, pp. 1-155.

Search Report dated Jun. 9, 2022 from Office Action for Chinese Application No. 201980004725.9 dated Jun. 15, 2022. 3 pgs.

\* cited by examiner

METHOD FOR PREPARING TRANSITION METAL COMPLEX

CROSS-REFERENCE TO RELATED APPLICATIONS

The present application is a national phase entry under 35 U.S.C. § 371 of International Application No. PCT/KR2019/003319 filed Mar. 21, 2019, which claims priority from Korean Patent Application No. 10-2018-0032599 filed Mar. 21, 2018, all of which are incorporated herein by reference.

TECHNICAL FIELD

The present invention relates to a method for preparing a transition metal complex.

BACKGROUND ART

[M(NCCH$_3$)$_6$][B(C$_6$F$_5$)$_4$] (M=Mn, Fe, Co, Ni, Cu, Zn), which is a complex of a transition metal in group 7 to group 12 and having a bulky counter anion, is widely used as a precursor of various catalysts, and recently receives much attention as having activity which is capable of polymerizing isobutene. Generally, in order to prepare such a compound, a photosensitive silver reagent is used as in the following reaction:

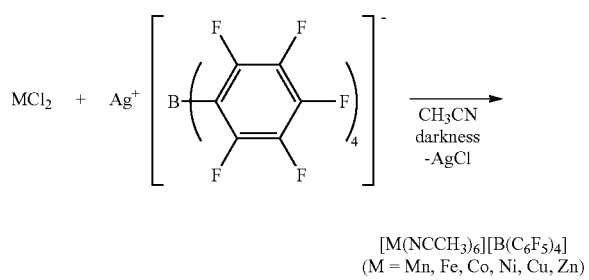

[M(NCCH$_3$)$_6$][B(C$_6$F$_5$)$_4$]
(M = Mn, Fe, Co, Ni, Cu, Zn)

A silver salt (AgCl) is produced in the reaction, but if incompletely removed, the silver salt may remain together with a catalyst, and the activity of the catalyst may be deteriorated due to poisoning. In addition, if the silver reagent is used with a transition metal having a low oxidation potential, a metal may be easily oxidized, and its use is limited.

Generally, the preparation of such silver reagent follows a synthetic method according to the following Reactions (a) and (b):

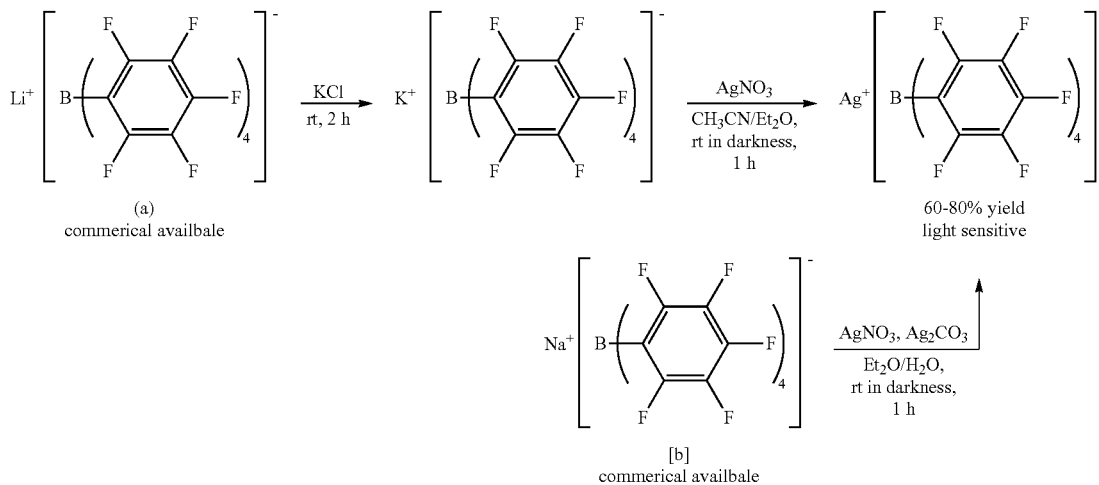

(a) commerical availbale 60-80% yield
light sensitive

[b] commerical availbale

In a metal chemistry field, which is sensitive to humidity, a method using KBArF (a) is preferred to a method using NaBArF (b) as a starting material. However, both of the methods are required to use an expensive silver reagent material (AgNO$_3$ or Ag$_2$CO$_3$), and there are defects of relatively low yield.

Meanwhile, a cationic polymerization method which is generally used for polymerizing a polyisobutene is very sensitive to humidity and impurities, and sometimes, the reaction may be finished or chain transfer may occur due to the reaction with a small amount of humidity or impurities during the propagation of a polymer chain, and the preparation of a polymer having a high molecular weight is difficult. In case of preparing a catalyst using the transition metal complex prepared using the conventional silver reagent, the complete removal of a lithium salt, a potassium salt or a silver salt produced during a preparation process is difficult. Accordingly, such a salt is included in the polymerization reaction as impurities and the production of a polymer having a high molecular weight is difficult. In addition, due to the contamination, there are defects of deteriorating the activity of a catalyst may arise.

Accordingly, as a method for preparing a transition metal complex having a bulky weakly coordinating anion as a precursor of a catalyst for polymerizing a polyisobutene, the development of a novel preparation method which solves the above-described defects is required.

Therefore, the present inventors found that a transition metal complex having a desired bulky weakly coordinating anion (WCA) may be easily prepared by reacting a carboxylate, nitrate, hydroxide or alkoxide of a transition metal in group 7 to group 12 with an organic borate-based compound containing a carbon-based, silyl-based or amine-based cation and a borate-based bulky anion in the presence of a coordinating solvent, and completed the present invention.

PRIOR ART DOCUMENTS

Non-patent Documents (Non-patent Document 1) Chem. Eur. J. 1998, 4, 1731.
(Non-patent Document 2) Chem. Eur. J. 2008, 14, 7997.
(Non-patent Document 3) Inorg. Chem. 1994, 33, 5374.

DISCLOSURE OF THE INVENTION

Technical Problem

An object of the present invention is to provide a novel method for preparing a transition metal complex.

Technical Solution

An embodiment of the present invention provides a method for preparing a transition metal complex, including a step of preparing a dispersion including a transition metal salt or alkoxide, and a coordinating solvent; and a step of reacting an organic borate-based compound containing a carbon-based, silyl-based or amine-based cation and a borate-based bulky anion, with the dispersion, wherein the transition metal is one or more selected from the metals in group 7 to group 12.

Advantageous Effects

The method for preparing a transition metal complex of the present invention uses an organic borate-based reagent which is stable and commercially widely used instead of a silver reagent which is photosensitive, expensive and difficult to synthesize, and a transition metal complex having a bulky weakly coordinating anion (WCA) may be prepared, and accordingly, economic feasibility is very huge when compared with the conventional technique.

In addition, in case of preparing a catalyst using the transition metal complex of the present invention and using thereof in a cationic polymerization method of a polyisobutene, polymerization activity is even more excellent when compared with the transition metal complex of the conventional technique, and a polymer having a high molecular weight may be produced with a smaller amount of a catalyst. In case of preparing a catalyst using the transition metal complex of the present invention, organic materials are produced as by-products, but these may be easily removed by drying or washing, and the contamination of the catalyst may be minimized. Accordingly, the transition metal complex of the present invention may be very advantageous in controlling the molecular weight of the polyisobutene polymer thus produced.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be understood that the words or terms should be interpreted as having a meaning that is consistent with their meaning of the technical idea of the invention, based on the principle that an inventor may properly define the meaning of the words or terms to best explain the invention.

The method for preparing a transition metal complex of the present invention is characterized in synthesizing a transition metal complex having a bulky weakly coordinating anion (WCA) by using an organic borate-based reagent which is stable and commercially widely used instead of a silver reagent which is photosensitive, expensive and difficult to synthesize.

An embodiment of the present invention provides a method for preparing a transition metal complex, including a step of preparing a dispersion including a transition metal salt or alkoxide, and a coordinating solvent; and a step of reacting an organic borate-based compound including a carbon-based, silyl-based or amine-based cation and a borate-based bulky anion, with the dispersion, wherein the transition metal is one or more selected from the metals in group 7 to group 12.

<Preparation of Dispersion>

The method for preparing a transition metal complex of the present invention includes a step of preparing a dispersion including a transition metal carboxylate ($M(OCOR)_a$), nitrate ($M(NO_3)_a$), hydroxide or alkoxide ($M(OR)_a$); and a coordinating solvent.

In the transition metal carboxylate ($M(OCOR)_a$), hydroxide or alkoxide ($M(OR)_a$), R may be hydrogen, an alkyl group, an aryl group or an allyl group, and the alkyl group may have 1 to 20 carbon atoms, or 1 to 12 carbon atoms, or 1 to 6 carbon atoms, or 1 to 4 carbon atoms, or 1 to 2 carbon atoms, the aryl group may have 6 to 20 carbon atoms, or 6 to 12 carbon atoms.

In the present invention, the transition metal (M) is one or more selected from the metals in group 7 to group 12. In an embodiment, the transition metal may be one or more selected from the group consisting of Mn, Fe, Co, Ni, Cu, and Zn. The oxidation number (a) of the transition metal may be monovalent, divalent, or trivalent according to the kind of the metal.

In addition, the transition metal used in the reaction may have an anhydrous metal compound or a hydrated metal compound type, without limitation.

In addition, in the step of preparing a dispersion, the dispersion is characterized in including a Lewis base coordinating solvent. The coordinating solvent may be any solvents as long as making a coordination bond with a central metal, without specific limitation, and may be a nitrile-based solvent, for example, an alkyl cyanide or an aryl cyanide, an ether-based solvent, for example, a dialkyl ether, a pyridine-based solvent, an amide-based solvent, a sulfoxide-based solvent, or a nitro-based solvent.

For example, the coordinating solvent may include one or more selected from the group consisting of acetonitrile, propionitrile, 2-methylpropanenitrile, trimethylacetonitrile, benzonitrile, diethyl ether, diallyl ether, pyridine, dimethylformamide, dimethyl sulfoxide, nitromethane, nitrobenzene and the derivatives thereof.

In the step of preparing a dispersion of the present invention, an excessive amount of the coordinating solvent may be used with respect to the transition metal salt or alkoxide. Preferably, the total amount of the coordinating solvent which reacts with the transition metal with respect to the transition metal salt or alkoxide is controlled to a molar ratio of at least 1:4, at least 1:6, at least 1:8, at least 1:12, at least 1:16, or at least 1:18. Most preferably, an amount range of the molar ratio is 1:6 to 1:18.

In addition, the dispersion may further include a non-coordinating solvent, and may be any solvents which may dissolve materials such as the remaining metal precursor (metal salt or alkoxide) or an organic borate, which is not used in the reaction and not making a coordination bond with the transition metal. Examples of the non-coordinating solvent may include one or more selected from the group consisting of benzene, alkyl benzene, for example, toluene, xylene or ethylbenzene, chlorobenzene, bromobenzene, chloroform and dichloromethane.

In case where the non-coordinating solvent is used as the solvent of the dispersion, the coordinating solvent which may react with the transition metal salt or alkoxide and be bonded as the ligand of the transition metal may preferably be injected in a suitable amount of the molar ratio of at least 1:6, at least 1:12, or at least 1:18 with respect to the transition metal salt or alkoxide. Most preferably, an amount range of the molar ratio is 1:12 to 1:18.

Accordingly, the method of the present invention may further include a step of adding a non-coordinating solvent before or after the step of reacting the organic borate-based compound with the dispersion.

<Formation of Transition Metal Complex>

The method for preparing a transition metal complex of the present invention includes a step of reacting an organic borate-based compound containing a carbon-based, silyl-based, or amine-based cation and a borate-based bulky anion, with the dispersion.

The organic borate-based compound may be represented by the following Formula 1:

[Formula 1]

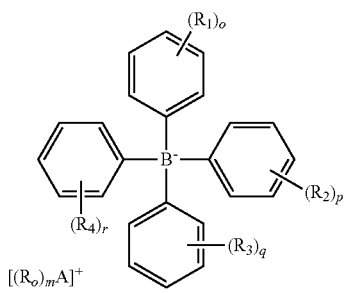

Where A is C, Si or N; $R_0$ is each independently hydrogen, an alkyl group of 1 to 20 carbon atoms, an alkoxy group of 1 to 20 carbon atoms, an aryl group of 6 to 20 carbon atoms, or an aryloxy group of 6 to 20 carbon atoms; preferably, hydrogen, an alkyl group of 1 to 12 carbon atoms, an alkoxy group of 1 to 12 carbon atoms, an aryl group of 6 to 12 carbon atoms, or an aryloxy group of 6 to 12 carbon atoms; more preferably, hydrogen, an alkyl group of 1 to 6 carbon atoms, or an alkoxy group of 1 to 6; m is 3 in case where A is C or Si, and 4 in case where A is N;

$R_1$ to $R_4$ are each independently hydrogen, a halogen group, or a substituted or unsubstituted alkyl group of 1 to 20 carbon atoms, preferably, a halogen-substituted alkyl group of 1 to 12 carbon atoms, more preferably, a halogen-substituted alkyl group of 1 to 4 carbon atoms, and o, p, q and r are each independently an integer of 1 to 5.

Particularly, the borate-based bulky anion may be one or more selected from the group consisting of tetrakis(phenyl) borate, tetrakis(pentafluorophenyl)borate, tetrakis[3,5-bis (trifluoromethyl)phenyl]borate and the derivatives thereof.

In an embodiment, in case of using the transition metal carboxylate ($M(OCOR)_a$ (R=hydrogen, an alkyl group, an aryl group, or an allyl group) in the method for preparing the transition metal complex of the present invention, the reaction of the organic borate-based compound and the dispersion may be performed by Reaction 1 below. In addition, the transition metal compound used in the reaction may include both an anhydrous metal compound ($M(OCOR)_a$) or a hydrate metal compound ($M(OCOR)_a \cdot B(H_2O)$) (a=1-3, B=1-10)) type.

[Reaction 1]

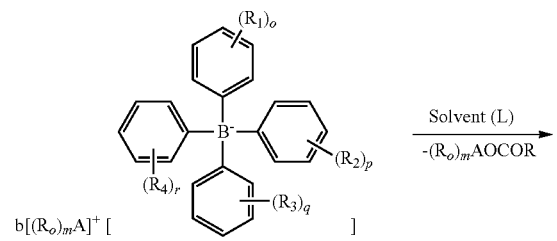

Where, R is hydrogen, an alkyl group, an aryl group or an allyl group, a and b are 1 to 3, c is 0 to 2, d is 4 to 6, and x and y are 1 to 3 and the same.

In addition, if a transition metal nitrate $M(NO_3)_a$ is used, the reaction of the organic borate-based compound and the dispersion is performed according to Reaction 2 below. In addition, the transition metal used in the reaction may include both an anhydrous metal compound ($M(NO_3)_a$) or a hydrate metal compound ($M(NO_3)_a \cdot B(H_2O)$) (a=1-3, B=1-10)) type.

[Reaction 2]

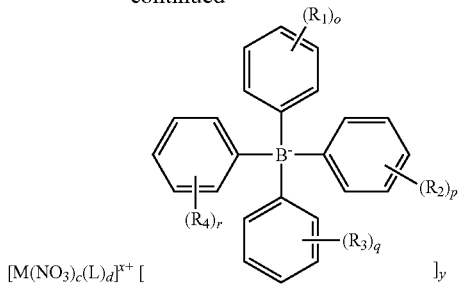

Where a and b are 1 to 3, c is 0 to 2, d is 4 to 6, and x and y are 1 to 3 and the same.

In addition, if a transition metal hydroxide or alkoxide $M(OR)_a$ (R=hydrogen, an alkyl group, an aryl group, or an allyl group) is used, the reaction of the organic borate-based compound and the dispersion may be performed according to Reaction 3 below. In addition, the transition metal used in the reaction may include both an anhydrous metal compound $(M(OR)_a)$ or a hydrate metal compound $(M(OR)_a \cdot B(H_2O))$ (a=1-3, B=1-10)) type.

[Reaction 3]

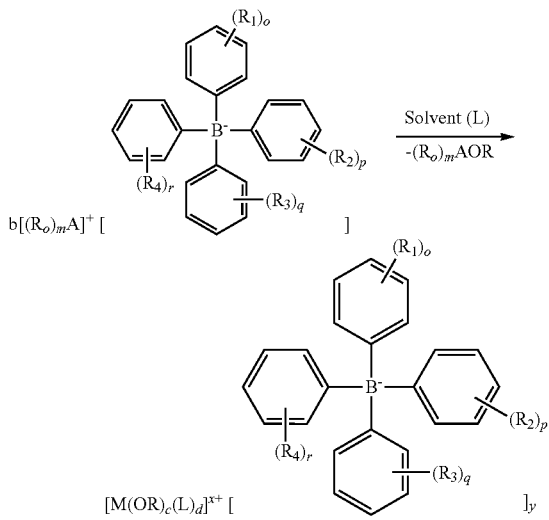

Where R is hydrogen, an alkyl group, an aryl group or an allyl group, a and b are 1 to 3, c is 0 to 2, d is 4 to 6, and x and y are 1 to 3 and the same.

In Reaction 1 to 3, each independently, M is a metal in group 7 to group 12, preferably, selected from the group consisting of Mn, Fe, Co, Ni, Cu and Zn; $R_0$ to $R_4$, A, m, o, p, q and r are the same as defined above; and L is a solvent molecule.

In the reaction step of the present invention, the molar ratio of the transition metal salt or alkoxide and the organic borate-based compound may be 1:1 to 1:3, or 1:2.

In addition, the reacting step may be performed by stirring at room temperature for 2 to 5 hours.

The method for preparing a transition metal complex of the present invention may further include a step of dissolving the organic borate-based compound in a coordinating solvent or non-coordinating solvent before reacting with the dispersion. It doesn't matter if the amount of the organic borate-based compound is small, but if a large amount of the organic borate-based compound is prepared and if the reaction is performed without dissolving thereof in the solvent, side reactions may occur due to heating and yield may be reduced.

In this case, the amount of the coordinating solvent or the non-coordinating solvent is not limited. However, in the reaction step, the total amount of the coordinating solvent may preferably be controlled with respect to the transition metal salt or alkoxide in a molar ratio of at least 1:4, at least 1:6, at least 1:8, at least 1:12, at least 1:16, or at least 1:18.

For example, the method of the present invention may further include a step of adding a coordinating solvent to the reactant after the step of reacting the organic borate-based compound with the dispersion.

The method for preparing a transition metal complex of the present invention may further include a step of washing with an organic solvent or distilling a polymer obtained in the reaction step. In an embodiment, $(R_0)_3AOCOR$, $(R_0)_3ANO_3$, or $(R_0)_3AOR$ (A=C or Si, $R_0$=each independently hydrogen, an alkyl group, an alkoxy group, an aryl group or an aryloxy group, and R=hydrogen, alkyl, aryl or allyl), which is produced in the reaction step may be easily removed by simple washing with an organic solvent or distilling. In case of using an amine-based borate, HOAc or $HNO_3$ produced together with aniline may also be easily removed through washing or distilling.

The organic solvent may include one or more selected from the group consisting of a linear or cyclic alkyl solvent, for example, pentane, cyclopentane, hexane, cyclohexane, heptane, or octane, and an ether solvent, for example, diethyl ether, or petroleum ether.

Another embodiment of the present invention provides a transition metal complex prepared by the preparation method. The transition metal complex of the present invention may be a catalyst used for preparing a polymer having a low molecular weight or the precursor thereof. In general, the number average molecular weight of the polymer having a low molecular weight may be in a range of 500 to 4500, preferably, 1000 to 3000, without limitation.

In an embodiment, the polymer having a low molecular weight may be prepared by polymerizing one or more monomers selected from the group consisting of styrene, isobutene, cyclopentadiene, dicyclopentadiene, tetrahydrofuran and the derivatives thereof.

EXAMPLES

Example 1

An anhydrous $CH_3CN$ (Aldrich Co.) dispersion (1 ml) of $Mn(OAc)_2$ (OAc=an acetate group) (100 mg) (Alfa Aesar Co.) was prepared. 2 equivalents of $[Et_3Si][B(C_6F_5)]$ (purchased from Asahi Glass Co.) with respect to the metal precursor was dissolved in anhydrous $CH_3CN$ (Aldrich Co.) (3 mL), and then added to the dispersion. The homogeneous mixture thus formed was stirred at room temperature for 5 hours. All solvents were evaporated under reduced pressure conditions, and remaining materials were washed with hexane. The resultant product was dried under reduced pressure conditions to obtain a powder type complex and stored at −30° C.

$[Mn(NCCH_3)_6][B(C_6F_5)_4]_2$ (quantitative yield), Selected IR (KBr): $\nu CN=2310, 2290$ cm$^{-1}$; elemental analysis calcd (%) for $C_{60}H_{18}B_2MnF_{40}N_6$: C 43.43, H 1.09, N 5.06. Found: C, 43.29; H, 1.29; N, 5.14.

Example 2

A powder type complex was obtained by the same method as in Example 1 except for using $Fe(OAc)_2$ (Alfa Aesar Co.) instead of $Mn(OAc)_2$.

$[Fe(NCCH_3)_6][B(C_6F_5)_4]_2$ (quantitative yield), Selected IR (KBr): vCN=2312, 2285 $cm^{-1}$; elemental analysis calcd (%) for $C_{60}H_{18}B_2FeF_{40}N_6$: C 43.41, H 1.09, N 5.06. Found: C, 43.77; H, 1.21; N, 5.11.

Example 3

A powder type complex was obtained by the same method as in Example 1 except for using $Co(OAc)_2$ (Aldrich Co.) instead of $Mn(OAc)_2$.

$[Co(NCCH_3)_6][B(C_6F_5)_4]_2$ (quantitative yield), Selected IR (KBr): vCN=2316, 2287 $cm^{-1}$; elemental analysis calcd (%) for $C_{60}H_{18}B_2CoF_{40}N_6$: C 43.33, H 1.09, N 5.05. Found: C, 42.98; H, 1.31; N, 5.33.

Example 4

A powder type complex was obtained by the same method as in Example 1 except for using $Cu(OAc)_2$ (Aldrich Co.) instead of $Mn(OAc)_2$.

$[Cu(NCCH_3)_6][B(C_6F_5)_4]_2$ (quantitative yield), Selected IR (KBr): vCN=2308, 2275 $cm^{-1}$; elemental analysis calcd (%) for $C_{60}H_{18}B_2CuF_{40}N_6$: C 43.21, H 1.09, N 5.04. Found: C, 43.45; H, 1.31; N, 4.97.

Example 5

A powder type complex was obtained by the same method as in Example 1 except for using $Zn(OAc)_2$ (Aldrich Co.) instead of $Mn(OAc)_2$.

$[Zn(NCCH_3)_6][B(C_6F_5)_4]_2$ (quantitative yield), Selected IR (KBr): vCN=2316, 2287 $cm^{-1}$; elemental analysis calcd (%) for $C_{60}H_{18}B_2ZnF_{40}N_6$: C 43.16, H 1.29, N 5.03. Found: C, 42.97; H, 1.41; N, 5.44.

Comparative Example 1

An experiment was performed in a glove box while minimizing light exposure. 0.19 g (1.12 mmol) of $AgNO_3$ was dissolved in 5 ml of an anhydrous acetonitrile solution and then slowly added to 10 ml of anhydrous acetonitrile in which 1.00 g (1.39 mmol) of $K[B(C_6F_5)_4]$ (Alfa Aesar Co.) was dissolved. After 1 hour, all solvents were removed under a reduced pressure. Then, the resultant product was dissolved in dichloromethane and $KNO_3$ salt which was a by-product was removed by filtering. Solvents were partially removed under a reduced pressure, and hexane was added thereto and crystallization was performed at −30° C. to produce 0.84 g of $Ag[B(C_6F_5)_4]$ (77% yield).

$CuCl_2$ (Aldrich Co.) was added to a dry solution of a silver salt in acetonitrile. The mixture thus obtained was stirred in a dark room for 2 hours. After filtering, solvents were removed in high-degree vacuum to produce a crude product, and this crude product was re-dissolved in dry dichloromethane. A small amount of precipitate was removed by filtering, and solvents were removed under high-degree vacuum to obtain a desired product.

$[Cu(NCCH_3)_6][B(C_6F_5)_4]_2$ (75%), Selected IR (KBr): vCN=2316, 2278 $cm^{-1}$; elemental analysis calcd (%) for $C_{60}H_{18}B_2CuF_{40}N_6$: C 43.21, H 1.09, N 5.04. Found: C, 42.97; H, 1.23; N, 5.07.

Comparative Example 2

$[Fe(NCCH_3)_6][B(C_6F_5)_4]_2$ was synthesized by the same method as in Comparative Example 1 except for using $FeCl_2$ instead of $CuCl_2$.

$[Fe(NCCH_3)_6][B(C_6F_5)_4]_2$ (80%), Selected IR (KBr): vCN=2314, 2284 $cm^{-1}$; elemental analysis calcd (%) for $C_{60}H_{18}B_2FeF_{40}N_6$: C 43.40, H 1.09, N 5.06. Found: C, 43.54; H, 1.03; N, 4.87.

Experimental Example 1

The products prepared in Examples 1 to 5 and Comparative Examples 1 and 2 as listed in Table 1 below were used as catalysts, respectively. 20 g of isobutene was injected into a pressurized reactor, and dichloromethane was added thereto to adjust the concentration of isobutene to 20 wt %. The reactant thus prepared was adjusted to 30° C. Then, the catalyst in an amount shown in Table 1 below was dissolved in dichloromethane in a glove box filled with argon, and then was put in the pressurized reactor using a pressurizing syringe. After that, the polymerization reaction was performed for 2 hours while stirring at 30° C., and after 2 hours, quenched with methanol.

TABLE 1

| | Catalyst used | Catalyst amount (wt %) | Conversion ratio (%) | Exo (%) | Mn |
|---|---|---|---|---|---|
| Example 1 | $[Mn(MeCN)_6][B(C_6F_5)_4]_2$ | 0.01 | 76 | 92 | 2200 |
| Example 2 | $[Fe(MeCN)_6][B(C_6F_5)_4]_2$ | 0.01 | 85 | 87 | 1900 |
| Example 3 | $[Co(MeCN)_6][B(C_6F_5)_4]_2$ | 0.01 | 74 | 86 | 2500 |
| Example 4 | $[Cu(MeCN)_6][B(C_6F_5)_4]_2$ | 0.01 | 82 | 95 | 2600 |
| Example 5 | $[Zn(MeCN)_6][B(C_6F_5)_4]_2$ | 0.01 | 84 | 88 | 1400 |
| Comparative Example 1 | $[Cu(MeCN)_6][B(C_6F_5)_4]_2$ | 0.2 | 40 | 52 | 1700 |
| Comparative Example 2 | $[Fe(MeCN)_6][B(C_6F_5)_4]_2$ | 0.1 | 53 | 62 | 1000 |

The catalyst prepared according to the Example of the present invention had higher reactivity than that of the Comparative Example, and polymerization may be performed with a small amount. In addition, in case of an exo ratio, it tends to decrease by isomerization if a large amount of the catalyst is added but according to an embodiment of the present invention, catalyst activity is good and thus, a small amount of the catalyst is used. Accordingly, the isomerization due to the catalyst may be minimized. Accordingly, it was confirmed that the exo ratio was very high.

In addition, during preparing the catalyst of the present invention, an organic material produced as a by-product is easily removed by drying or washing, and the contamination of the catalyst is minimized. Accordingly, it was found that the molecular weight of the polyisobutene polymer produced by using a smaller amount of the catalyst, if the catalyst prepared according to an embodiment of the present invention was used, was in a relatively high range when compared with the Comparative Example using the catalyst prepared by the conventional technique.

Particularly, when comparing Example 2 with Comparative Example 2, the number average molecular weights of the polymers thus obtained were 1900 and 1000, respectively, and a polymer having a higher molecular weight was obtained using a smaller amount of the catalyst in Example 2 when compared with Comparative Example 2. In addition, when comparing Example 4 with Comparative Example 1, the number average molecular weights of the polymers thus obtained were 2600 and 1700, respectively, and a polymer having a higher molecular weight was obtained using a smaller amount of the catalyst in Example 4. Accordingly, the transition metal complex of the present invention is advantageous in controlling the molecular weight of a polymer thus produced.

The invention claimed is:

1. A method for preparing a transition metal complex, the method comprising:
    a step of preparing a dispersion comprising a transition metal salt or alkoxide, and a coordinating solvent; and
    a step of reacting an organic borate-based compound containing a carbon-based, silyl-based or amine-based cation, and a borate-based bulky anion, with the dispersion,
    wherein the transition metal is one or more selected from metals in group 7 to group 12,
    the coordinating solvent comprises one or more selected from the group consisting of acetonitrile, propionitrile, 2-methylpropanenitrile, trimethylacetonitrile, benzonitrile, diethyl ether, diallyl ether, pyridine, dimethylformamide, dimethyl sulfoxide, nitromethane, and nitrobenzene, and
    the organic borate-based compound is represented by the following Formula 1:

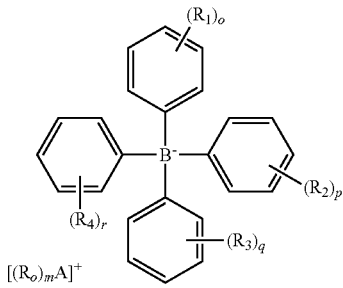

[Formula 1]

in the above Formula 1,
A is C, Si or N,
$R_0$ is each independently hydrogen, an alkyl group of 1 to 20 carbon atoms, an alkoxy group of 1 to 20 carbon atoms, an aryl group of 6 to 20 carbon atoms, or an aryloxy group of 6 to 20 carbon atoms,
m is 3 when A is C or Si, or 4 when A is N,
$R_1$ to $R_4$ are each independently hydrogen, a halogen group, or a substituted or unsubstituted alkyl group of 1 to 20 carbon atoms, and
o, p, q and r are each independently an integer of 1 to 5.

2. The method for preparing a transition metal complex according to claim 1, wherein
    $R_0$ is each independently hydrogen, an alkyl group of 1 to 12 carbon atoms, an alkoxy group of 1 to 12 carbon atoms, an aryl group of 6 to 12 carbon atoms, or an aryloxy group of 6 to 12 carbon atoms; and
    $R_1$ to $R_4$ are each independently hydrogen, a halogen group, or a halogen-substituted alkyl group of 1 to 12 carbon atoms.

3. The method for preparing a transition metal complex according to claim 1, wherein the borate-based bulky anion is one or more selected from the group consisting of tetrakis(phenyl)borate, tetrakis(pentafluorophenyl)borate, and tetrakis[3,5-bis(trifluoromethyl)phenyl]borate.

4. The method for preparing a transition metal complex according to claim 1, wherein the transition metal salt is a carboxylate, a nitrate or a hydroxide of the transition metal.

5. The method for preparing a transition metal complex according to claim 1, wherein the transition metal is one or more selected from the group consisting of Mn, Fe, Co, Ni, Cu and Zn.

6. The method for preparing a transition metal complex according to claim 1, wherein a molar ratio of the transition metal salt or alkoxide and the organic borate-based compound is 1:1 to 1:3 in the reacting step.

7. The method for preparing a transition metal complex according to claim 1, further comprising a step of dissolving the organic borate-based compound in a coordinating solvent or non-coordinating solvent prior to reacting with the dispersion.

8. The method for preparing a transition metal complex according to claim 1, wherein a molar ratio of the transition metal salt or alkoxide and the coordinating solvent is 1:4 to 1:18 in the reacting step.

9. The method for preparing a transition metal complex according to claim 1, further comprising a step of washing with an organic solvent or distilling the complex obtained from the reacting step.

10. The method for preparing a transition metal complex according to claim 9, wherein the organic solvent is one or more selected from the group consisting of a linear alkyl solvent, a cyclic alkyl solvent, and an ether solvent.

11. The method for preparing a transition metal complex according to claim 1, wherein the transition metal complex is used as a catalyst or the precursor thereof, which is used for preparing a polymer.

12. The method for preparing a transition metal complex according to claim 11, wherein the polymer having a low molecular weight is prepared by polymerizing one or more monomers selected from the group consisting of styrene, isobutene, cyclopentadiene, dicyclopentadiene, and tetrahydrofuran.

13. The method for preparing a transition metal complex according to claim 1, wherein the transition metal is anhydrous or hydrated.

* * * * *